Aug. 23, 1960
C. O. FINN
2,949,871
APPARATUS FOR VERTICAL MULCHING OF SOIL AND OTHER PURPOSES
Filed April 3, 1957
2 Sheets-Sheet 2
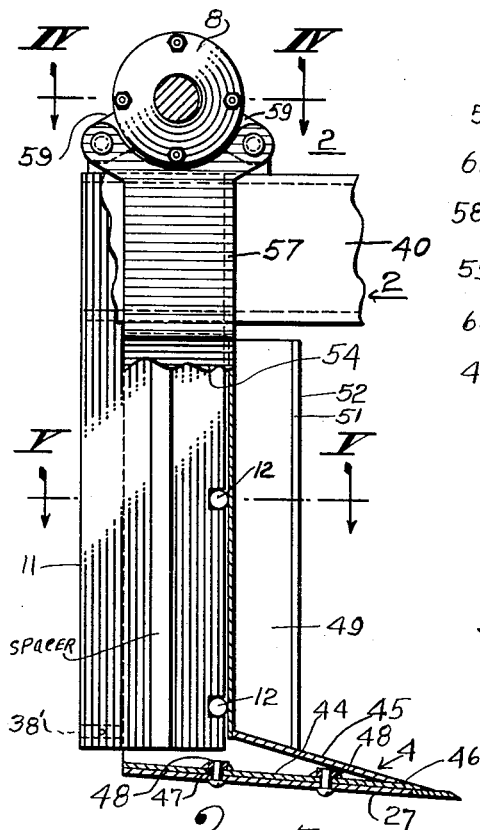
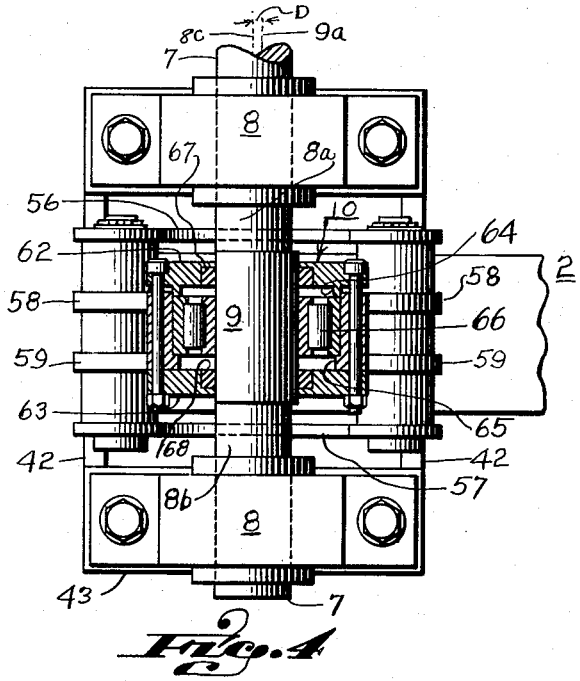
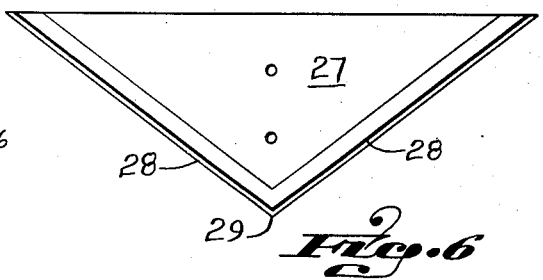
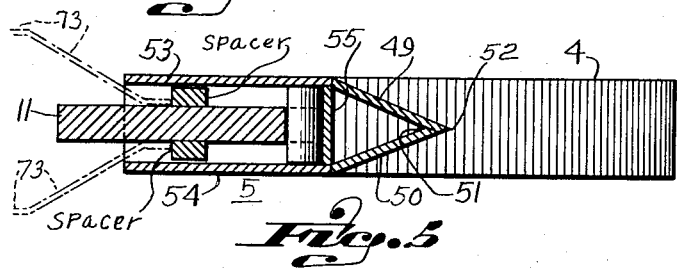
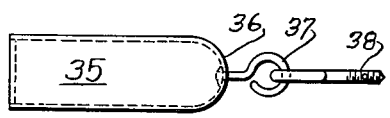
INVENTOR.
Charles O. Finn
BY Gerald B. Tjoflat
His Attorney United States Patent Office 2,949,871
Patented Aug. 23, 1960

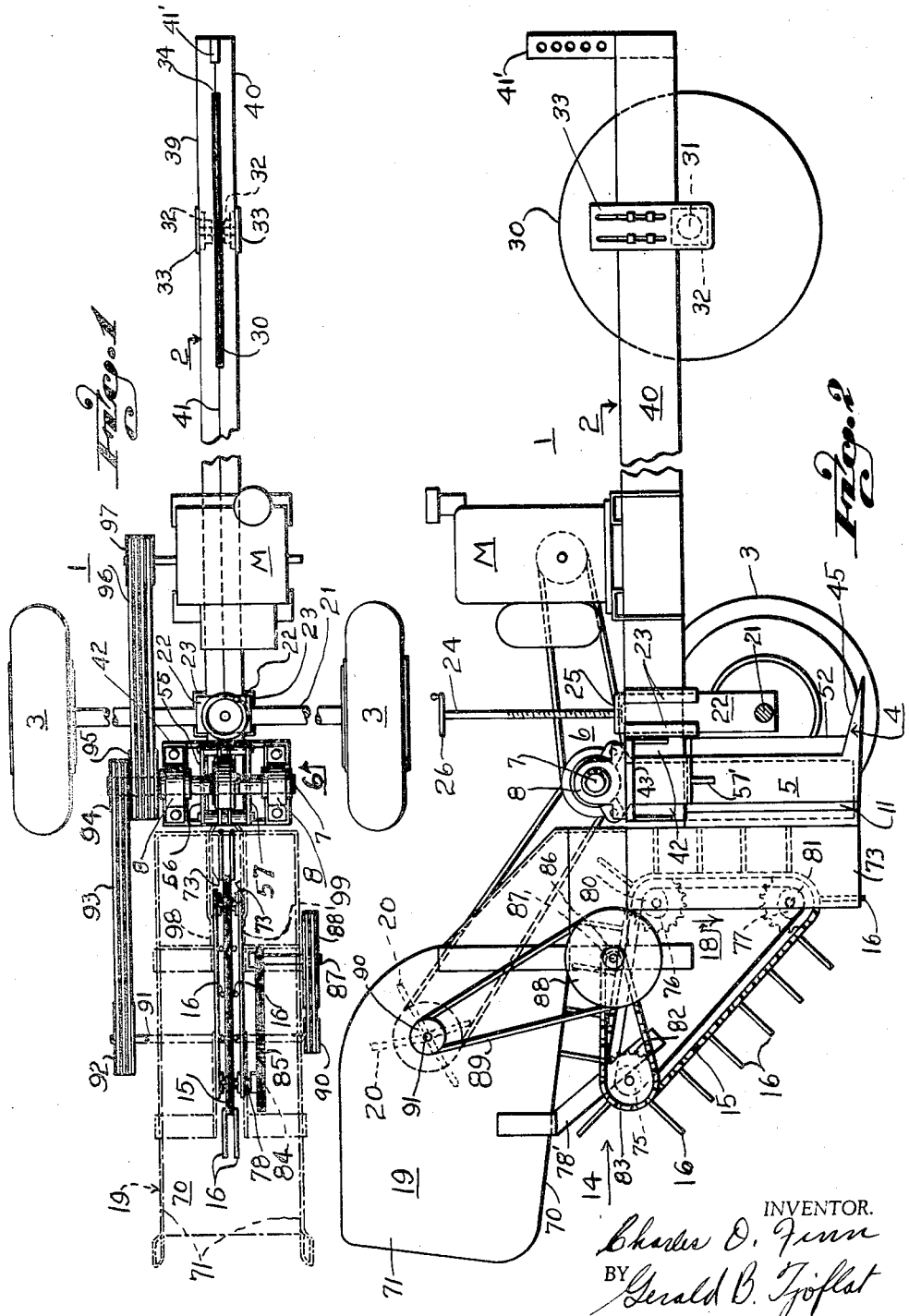

2,949,871

APPARATUS FOR VERTICAL MULCHING OF SOIL AND OTHER PURPOSES

Charles O. Finn, Cincinnati, Ohio, assignor to The Finn Equipment Company, Cincinnati, Ohio, a corporation of Ohio Filed Apr. 3, 1957, Ser. No. 650,425

8 Claims. (Cl. 111—1)

This invention relates to soil conditioning apparatus and more particularly to machines for mulching soil, cutting roots of brush and shrubs below the surface of the ground to facilitate the removal of the brush and shrubs and at the same time conditioning the soil for agricultural and soil and water conservation purposes.

In recent times experiments in vertical mulching have been made by agronomists. A report on such experiments is given in the Farm Journal, December 1956, pages 39 and 118. According to that report the ability of soil to hold moisture has been increased very markedly by cutting a deep narrow trench with a chisel having a V-shaped opener extending upwardly from the chisel to keep the trench open, and then filling or stuffing the trench with straw, trash or other fibrous vegetable matter. Such a procedure is called vertical mulching.

Vertical mulching catches and stores two to three times as much water thereby materially decreasing runoff—sops up melting snow and rains when the ground is frozen—gets more air into the sub-soil to stimulate soil bacteria and earth worms—and makes tile lines work better in hard-to-drain soils.

According to the report supra, the vertical mulch trenches were spaced at eighty inch intervals.

An object of this invention is to provide a machine for efficiently performing vertical mulch operations.

Another object of the invention is to provide a machine for effecting vertical mulch operations and simultaneously forming a drainage channel in the bottom of the trench without the necessity of using drainage tile.

A further object of the invention is to provide a machine that can be used to sever sub-soil roots of brush and shrubs and thereby facilitate clearing of land of brush and shrubs while at the same time conditioning the soil for immediate seeding.

A still further object of the invention is to provide a machine having a chisel and a trench opener, with means for so vibrating the chisel that the power required to pull the chisel through the soil is materially reduced.

A further object is to provide a machine having a vibrating chisel support to which chisels of various widths may be attached.

A still further object is to provide a machine having a vibrating chisel and a mole device for forming a drainage trench.

A still further object is to provide a vibrating chisel machine as above set forth having a rotating disc for cutting roots and the like as the chisel is pulled through the sub-soil.

And a still further object is to provide a machine as above set forth having means for stuffing the trench cut by the chisel, with straw, trash, or other fibrous materials.

The foregoing and other objects will be apparent to those of ordinary skill in the art to which the invention pertains.

In the drawings:

Figure 1 is a top plan view, partly in dot-dash, of a machine embodying a form of the invention;

Fig. 2 is a view in side elevation of the machine;

Fig. 3 is a view partly in side elevation and partly in vertical section of a vibrating chisel embodied in the machine of Figs. 1 and 2;

Fig. 4 is a view in section taken on line IV—IV of Fig. 3;

Fig. 5 is a view in section taken on line V—V of Fig. 3;

Fig. 6 is a top plan view of a modified form of chisel; and

Fig. 7 is a plan view of a mole adapted for use with the machine of Figs. 1 and 2.

In the drawings a machine 1 is shown that can be used for mulching and conditioning soil. It comprises a draw bar frame member 2 supported on wheels 3. Adjacent the wheels 3 and preferably rearwardly thereof is a chisel 4 secured to the lower end of a vertically extending support structure 5. Structure 5 and chisel 4 are mounted on a means 6 for vibrating the same. The vibrating means comprises a shaft 7 journaled in pillow block bearings 8, and having an eccentric portion 9 that extends through and is journaled in a bearing 10 secured to the upper part of structure 5. The shaft 7 and its eccentric portion 9 are driven by a motor M as will be explained infra.

The chisel 4 is adapted to be drawn under the surface of the soil at various depths. The chisel support structure 5 parts the ground as the chisel is performing its function. The resistance offered to the chisel and structure 5 as they move through the ground is substantial. Therefore, in order to resist that thrust, a backing member 11 is provided. It is rigidly secured to the frame 1 and is provided with roller bearings 12 that engage the rearward side of the structure 5 thereby taking the thrust encountered.

In order that the machine may be used for vertical mulching, means 14 are provided for stuffing, so to speak, the trench formed by the chisel 4 and the structure 5, with fibrous material, such as hay, straw, shredded cornstocks, sawdust or other suitable vegetable matter. That stuffing keeps the trench open and porous so that it can hold much rain or melted snow, the larger part of which would run off except for the vertically mulched trench. The trenches can vary in depth from relatively shallow to twenty or more inches. When it is realized that these trenches would normally be spaced at centers of eighty inches or less, it can be seen that the water holding capacity of the soil so mulched can be increased tremendously. Other advantages accrue also as stated supra.

The mulch stuffer means 14 comprises a power driven conveyor 15 having its reaches disposed in a vertical plane and provided with spaced fingers 16 for feeding the mulch into the trench. The conveyor 15 travels in the direction of arrow 18 and picks up mulch from a box 19. The mulch is carried downwardly into the trench to the bottom thereof. The mulch adheres to the sides of the trench and keeps it from caving in when the water comes. The box may, if desired, be provided with a shredder or beater 20 so that bales of hay, straw and the like can be broken up and carried by the conveyor into the trench.

The wheels 3 are mounted on an axle 21 journaled in supports 22 that are movable vertically in a box-like guide 23. The supports are connected to a screw 24 that is threaded through a plate 25 secured to the top of the machine frame. The screw may be provided with a hand wheel 26 whereby the wheels may be raised or lowered with reference to the frame to control the depth to which the chisel descends under the soil surface.

The machine may also be used to cut the roots of shrubs, brush and small trees at any desired depth below the surface of the ground to thereby facilitate removal of the brush and the clearing of the ground and at the same time conditioning the soil for seeding and planting.

For this purpose a relatively wide chisel 27 may be used. As shown in the drawings, the chisel 27 comprises a relatively wide triangular blade having a cutting edge 28 on the edges thereof which intersect at a point 29. The width of the chisel as measured at its base may vary from three to four inches to forty-eight inches, depending on the root and soil conditions encountered. The wide root cutting chisel may be bolted to the bottom of the mulch chisel 4.

In order to facilitate the cutting and removal of roots, the machine may be provided with a slicing disc 30 mounted on an axle 31 at the forward end of frame 1. The axle is journaled in bearings 32 carried by plates 33 disposed on opposite sides of and bolted to frame 1. The plates may be provided with a plurality of bolt holes so that the distance between the slice disc axle and the bottom of the frame may be adjusted. That adjustment controls or regulates the depth of cut of the slice disc 30. The slice disc 30 normally should cut to the same depth as the chisel blade enters the ground.

As shown, the slice disc is centered in a slot 34 in the frame 1 so that it lines up with the point of the chisel.

In cases where soil requires drainage, it is customary to lay tile in the drainage ditches or in the soil to be drained. The machine of this invention is provided with means whereby as the vertical mulching operation is performed, a drainage trench is formed in the bottom of the mulch slot, without the necessity of laying tile. The means illustrated comprises a cylindrical member 35 which may be called a mole. The head end 36 of the mole may be closed and spherical in shape and provided with an eye 37 and an eye bolt 38 whereby it may be threaded into the rear edge of member 11 near the bottom thereof, a tapped hole 38' being provided for that purpose. Thus, as the machine is cutting and stuffing a mulch trench, the drainage run is being formed in the bottom of the trench. Since the mole or drainage trench also receives the protection of the mulch, the trench will remain open to carry off excess water.

The frame 1

Frame 1 comprises a pair of channels 39 and 40, the flanges of which abut edge to edge. The flanges may be welded at the flange abutting line 41 to form a draw bar frame having a box section. The forward end of the draw bar 1 may be provided with a hitch 41' extending vertically from the same and provided with spaced holes whereby a tractor (not shown) may be hitched at various elevations above the draw bar. The rear end of the draw bar terminates a short distance to the rear of the vibrating means 6.

The bearings 8 are supported on spaced channels 42 extending outwardly from each side of and at right angles to member 1. The channels 42 may be welded or otherwise rigidly secured to the draw bar. The outer ends of members 42 are cross braced with members 43 on which the bearings 8 rest and to which they are bolted.

The chisel 4 and support 5

The chisel 4 comprises a bottom plate 44 of substantially rectangular shape and a rearwardly extending, upwardly sloping wedge plate 45. The forward edges of these plates are feathered at 46 and welded. The foremost edge of plate 44 comes to a sharp knife edge.

The bottom plate 44 is provided with spaced bolt holes 47. To the inner face of plate 44, nuts 48, placed over the holes as shown, are welded to accommodate the bolts used for securing the wide root cutting chisel 27 to plate 44.

The support means 5 comprises a pair of vertical plates 49 and 50 arranged in triangular form, feathered to form a sharp leading edge 51, and welded at the vertical line 52. The rear edges of plates 49 and 50 are welded to spaced vertical plates 53 and 54 while the forward edges of the latter are welded to a vertically extending cross brace 55.

The upper ends of members 53 and 54 have portions 56 and 57 that are outwardly offset from draw bar 1, but located respectively between the bearings 8 and the adjacent sides of the draw bar. Portions 56 and 57 are reinforced with gussets 57' and are bolted or otherwise secured to arms 58 and 59 forming a part of the assembly of the eccentric bearing 10.

Bearing assembly 10

The shaft 7 comprises portions $8a$ and $8b$ which are turned to a common axis of rotation $8c$ and the eccentric portion 9. Portions $8a$ and $8b$ are journaled in the bearings 8. Portion 9 is turned about an axis of rotation $9a$ which is offset a $\frac{1}{32}$ or $\frac{1}{16}$ of the diameter of the shaft portions $8a$ and $8b$. Thus the distance D between axes $9a$ and $8c$ is the amount of eccentricity and represents the throw of the eccentric and the vertical travel of the chisel 4 and the support means 5. The amount of eccentricity may be adjusted in the design according to the amount of throw required.

Bearing 10 is preferably of the sealed roller type. It comprises a housing 61 that embraces the eccentric 9 and caps 62 and 63 that are bolted to the ends of the housing as shown. The cap 62 and housing 61 are provided with raceways or annular shoulders 64 and 75, respectively, to accommodate roller bearings 66. The caps may be recessed to accommodate lubricant seals 67 and 68.

The housing 61 is provided with the aforementioned spaced arms 58 and 59 to which the yoke members 56 and 57 may be rigidly attached by means of strong bolts as shown.

Mulch stuffing means 14

The mulch stuffing means 14 includes the mulch shredder box 19 which has a sloping bottom 70 and side boards 71. At the forward end of the box 19 is a feeder chute 72 that terminates in a slot formed by spaced shield or guard plates 73 that extend vertically downward and terminate at a location behind the chisel 4.

The conveyor 15 comprises an endless belt 74 to which spikes or finger 16 are secured in parallel rows, spaced in each row as shown. The belt 74 runs over pulleys 75, 76 and 77. Pulley 75 has an axle or shaft 78 supported in brackets 78' attached to the shredder box 19. The pulleys 76 and 77 are mounted on axles 80 and 81, respectively, supported by the shield or guard plates 73. Each of the pulley axles are provided with sprockets 82 on which a sprocket chain 83 runs.

The axle pulley 75 is provided with a sprocket 84. It is driven by a chain 85 from a sprocket pinion 86 mounted on a shaft 87. The shaft 87 is provided with a pulley 88 driven by a belt 89 which in turn is driven by a pulley 90 on a shaft 91 supported by the sideboards of box 19. On shaft 91 is a pulley 92 driven by a belt drive 93 which in turn is driven by a pulley 94 on eccentric shaft 7. The shaft 7 is provided with a pulley 95 driven by a belt 96 from a pulley 97 on the power or motor unit M.

The mulch feeder assembly is supported by and attached to the draw bar frame 1 by plates 98 and 99.

The width of the vertical chute formed by the shield or guard plates 73 is such as to fit into the mulch trench formed by the chisel 4 and the trench opener 5. Its position with reference to the chisel 4 is constant so that it and the chisel will always be adjusted to the depth of the mulch trench.

As the mulch moves forward towards the chute, it is picked up by the finger 16, carried downwardly between the plate 73 into the trench formed by the chisel 4 and the trench opener 5.

The vibrating chisel is an important feature of the invention because it materially reduces the power required to pull the chisel and its opener 5 through the ground. Furthermore, the vibrating chisel materially reduces the tractive power requirement when it is used to sever the sub-soil roots of shrubs, brush and the like. Also in cases where there is hardpan, the vibrating chisel will move through the same and break it up with surprisingly low tractive power. The vibrating chisel principle also makes it possible to work deeply in the ground and to cut wide swaths below surface level.

In the case of brush removal, it will be apparent that since the roots are cut in swaths up to say 48 inches in width and the slicer disc 30 cuts the roots off in the middle of the chisel cut, it is relatively easy to remove the shrubs and brush because their anchorage in the soil has been destroyed. While the roots are being cut in that manner the soil is loosened and aerated so that after dragging the cleared land is ready for seeding and planting.

Having thus described the invention, it will be apparent to those of ordinary skill in the art to which the invention pertains, that various modifications and changes may be made in the illustrated embodiment without departing from either the spirit or the scope thereof.

Therefore, what is claimed as new and desired to be secured by Letters Patent is:

1. In a machine for vertical trench mulching soil, comprising a wheel supported draw bar having shaft bearings secured thereto, a motor drivable shaft journaled in said bearings and having an eccentric cam thereon, a chisel support having a bearing for receiving said eccentric cam, said chisel support extending vertically downward from the bearing and being vibrated by the eccentric cam when driven by said shaft, a chisel mounted forwardly of and adjacent to the lower end of said chisel support for forming a trench in soil as it is propelled through the same, a rigid depending backing member secured to the draw bar and disposed to buck against the rearward side of the chisel support member to resist the thrust imposed on the chisel as it is drawn through the soil, means for raising and lowering the chisel support member to thereby establish the desired depth of the trench, a power drivable conveyor having a frame disposed rearwardly of the backing member and secured to the draw bar, said conveyor having an endless conveyor member for delivering mulch into the trench, said endless conveyor member having its flights traveling in a vertical plane into and out of said trench behind said chisel support and backing member, and means for supplying mulch to the conveyor.

2. A machine as in claim 1 in which the leading edge of the chisel support is of substantially V-shape, the apex of the V extending vertically from the chisel and forwardly in the direction of motion of the machine.

3. A machine as in claim 1 in which a roller bearing is disposed between the rigid backing member and the rigid support member for said chisel, said roller bearing receiving thrust from the chisel and transmitting the same to the rigid backing member.

4. In a soil conditioning and vertical trench forming machine having support wheels, a draw bar having means for supporting the same on said wheels, a vertically vibratable chisel support extending downwardly from said draw bar, a chisel attached to and forwardly of the chisel support at a location adjacent the lower end thereof, a rigid backing member secured to said draw bar rearwardly of the chisel support and provided with roller bearings for engaging and bucking up the chisel support, the forward edge of the chisel support being provided with vertically extending diverging members for parting the walls of the trench, means secured to said draw bar for supporting and vibrating the chisel support and chisel in a substantially vertical plane, and means for vertically adjusting the chisel support and chisel to the depth at which the chisel is to form a trench in soil.

5. A machine as in claim 4 in which the backing member comprises a relatively rigid plate of rectangular shape in cross section and having a narrow side forward of the same, and that the chisel support comprises spaced members, one on each side of the backing member, and having a V-shaped member at the forward edges thereof, the apex of the V being vertical, that the spaced members are connected to the vibrating means, and that anti-friction thrust bearing means are disposed at the forward side of the backing members to be engaged by the chisel support.

6. In a soil conditioning and vertical trench forming and mulching machine having support wheels, a draw bar having means for supporting the same on said wheels, a vibratable chisel support secured to said draw bar and depending therefrom, a chisel disposed forwardly of and secured to the chisel support at a location adjacent the lower end thereof, a rigid backing member for the chisel support secured to and extending downwardly from the draw bar at a location to buck against the rearward side of the chisel support to resist the thrust imposed on the chisel as it is pulled through the soil, means for supporting the chisel support and chisel on said frame for vertical vibration relative thereto, means for vertically adjusting the chisel support so that the depth of the trench being formed may be adjusted, a power drivable conveyor carried by the draw bar at the rearward end thereof, said conveyor having an endless conveyor member for carrying mulch into the trench, means for driving said endless conveyor member, the flights of said conveyor member traveling in a vertical plane into and out of the trench behind said chisel support and backing member, and means for supplying mulch to the conveyor.

7. A machine as in claim 6 in which a roller bearing is disposed between the rigid backing member and the chisel support in thrust receiving relation thereto.

8. A machine as in claim 6 in which the chisel support is provided with vertically disposed rearwardly diverging members for parting the ground as the chisel is pulled through the same.

References Cited in the file of this patent

UNITED STATES PATENTS

| | | |
|---|---|---|
| 1,141,965 | Kimmel | June 8, 1915 |
| 1,765,185 | Umbarger | June 17, 1930 |
| 2,087,639 | Demeulenaere | July 20, 1937 |
| 2,748,535 | Skromme et al. | June 5, 1956 |
| 2,765,724 | Kinsinger | Oct. 9, 1956 |
| 2,792,769 | Harshberger | May 21, 1957 |

FOREIGN PATENTS

| | | |
|---|---|---|
| 767,411 | France | May 1, 1934 |
| 131,097 | Great Britain | Aug. 11, 1919 |
| 519,046 | Great Britain | Mar. 14, 1940 |
| 25,566 | Norway | Feb. 22, 1915 |

OTHER REFERENCES

Publication: Farm Journal, volume 80, No. 1, Jan. 1956, pages 18–19.

Agronomy Journal, volume 48, April 1956, pages 192–193 (Article, Something New in Subsoiling).